(12) United States Patent
Cao et al.

(10) Patent No.: US 8,144,862 B2
(45) Date of Patent: Mar. 27, 2012

(54) METHOD AND APPARATUS FOR THE DETECTION AND SUPPRESSION OF ECHO IN PACKET BASED COMMUNICATION NETWORKS USING FRAME ENERGY ESTIMATION

(75) Inventors: Binshi Cao, Bridgewater, NJ (US);
Doh-Suk Kim, Basking Ridge, NJ (US);
Ahmed A Tarraf, Bayonne, NJ (US)

(73) Assignee: Alcatel Lucent, Paris (FR)

( * ) Notice: Subject to any disclaimer, the term of this patent is extended or adjusted under 35 U.S.C. 154(b) by 801 days.

(21) Appl. No.: 12/231,646

(22) Filed: Sep. 4, 2008

(65) Prior Publication Data
US 2010/0054454 A1 Mar. 4, 2010

(51) Int. Cl.
*H04M 9/08* (2006.01)
(52) U.S. Cl. ............... 379/406.08; 704/201; 379/406.01
(58) Field of Classification Search ............. 379/406.01; 704/201
See application file for complete search history.

(56) References Cited

U.S. PATENT DOCUMENTS
6,011,846 A * 1/2000 Rabipour et al. ........ 379/406.06

OTHER PUBLICATIONS

3rd Generation Partnership Project 2, Enhanced Variable Rate Codec, Speech Service Option 3 for Wideband Spread Spectrum Digital Systems (Apr. 2004).*
U.S. Appl. No. 11/523,051, filed Sep. 19, 2006, B. Cao, et al.
U.S. Appl. No. 11/866,448, filed Oct. 3, 2007, B. Cao, et al.
U.S. Appl. No. 11/967,338, filed Dec. 31, 2007, L. Kalampoukas, et al.

* cited by examiner

*Primary Examiner* — Walter F Briney, III
(74) *Attorney, Agent, or Firm* — C. Bilicska

(57) ABSTRACT

A method and apparatus for use in suppressing acoustic echo in a target speech signal being transmitted through a packet-based communications network uses frame energy estimation applied to the target speech signal and to a reference speech signal. The method or apparatus estimates one or more reference speech energy levels in one or more reference packets based on one or more of the speech parameters generated by the speech encoding of the reference signal; estimates a target speech energy level in a target packet based on one or more of the speech parameters generated by the speech encoding of the target signal; compares the target speech energy level to one or more reference speech energy levels; and detects an echo in the target speech signal based on the comparison of the target speech energy level to the one or more reference speech energy levels.

22 Claims, 3 Drawing Sheets

METHOD AND APPARATUS FOR THE DETECTION AND SUPPRESSION OF ECHO IN PACKET BASED COMMUNICATION NETWORKS USING FRAME ENERGY ESTIMATION

FIELD OF THE INVENTION

The present invention relates generally to the field of packet-based communications networks which provide, for example, Voice over Internet Protocol (VoIP) communications services, and more particularly to a method and apparatus for detecting and suppressing echo in such a communications network.

BACKGROUND OF THE INVENTION

As packet-based voice technologies have matured, service providers have started implementing packet-based voice implementations in order to reduce operational expenses. During a voice call, a party to the call may hear his own voice due to echoes at the far end of the voice call. The likelihood of such echoes increases when parties to the voice call use hands-free communications capabilities, such as speakerphones. The most common approach for detecting and suppressing such echoes is acoustic echo cancellation (AEC). While acoustic echo cancellation in networks which directly transmit speech waveform data, such as, for example, Time Division Multiplexing (TDM) networks, is well developed, it is inherently more difficult to perform echo cancellation in packet-based networks, such as, for example, Voice over Internet Protocol (VoIP) networks, which encode the waveform data with use of voice coders prior to transmission. Furthermore, the problem of acoustic echo has been exacerbated by packet networks because network packet delays can vary widely from packet to packet, as well as by the fact that typical packet propagation latency in packet networks has increased significantly as compared to, for example, TDM networks.

Network-based echo suppressors in packet-based networks have conventionally operated as follows. First, the speech waveforms are regenerated in network equipment (e.g., mobile switching center in wireless communication) by the decoding of the speech bitstream (i.e., the encoded packet data) back into waveform data, which waveform data had been originally encoded at the transmitting side of the network. After the analysis and possible enhancement (e.g., the removal of echo) of the decoded data, the waveforms are then re-encoded back into a packet bitstream by the speech coding system for transmission to the receiving side. This tandem coding process (i.e., "transcoding") generally degrades total end-to-end speech quality, especially for low bit rate coders in modern wireless networks, and moreover, it introduces additional delay.

SUMMARY OF THE INVENTION

In accordance with various illustrative embodiments of the present invention, transcoder Free Operation (TrFO) provides a way to mitigate the above-described problems. Specifically, TrFO allows low end-to-end delay while maintaining higher quality by transmitting the encoded bitstream at the sending side to the receiving side without the additional decoding and encoding processes within the network. In particular, and in accordance with various illustrative embodiments of the present invention, an efficient method is proposed to suppress acoustic echo by modifying the contents of speech codec bitstream without first decoding it into speech waveforms, by using, inter alia, frame energy estimation techniques.

More particularly, the present invention provides a method and apparatus for use in suppressing acoustic echo in a target speech signal being transmitted through a packet-based communications network, the target speech signal and a reference speech signal each having been encoded with a speech coder which generates speech parameters, the target speech signal comprising a sequence of target packets and the reference signal comprising a sequence of reference packets, wherein the method or apparatus estimates one or more reference speech energy levels in one or more reference packets based on one or more of said speech parameters generated by said encoding of said reference signal; estimates a target speech energy level in a target packet based on one or more of said speech parameters generated by said encoding of said target signal; compares the target speech energy level to said one or more reference speech energy levels; and detects an echo in said target speech signal based on said comparison of said target speech energy level to said one or more reference speech energy levels.

DETAILED DESCRIPTION OF THE PREFERRED EMBODIMENTS

Figure 1:
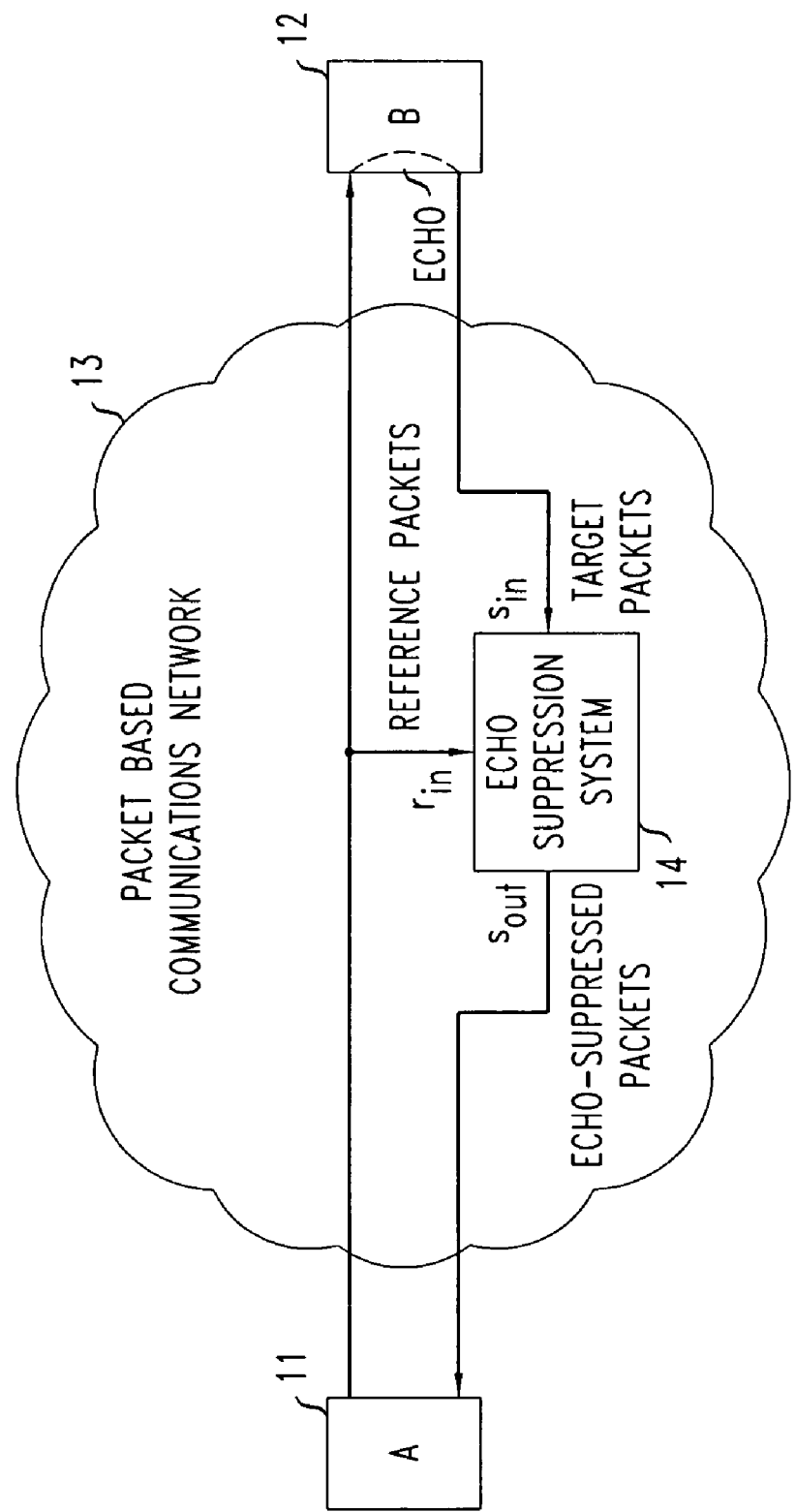
FIG. 1 shows a network-based echo suppression system for use in packet-based communications networks in accordance with an illustrative embodiment of the present invention.

In accordance with the illustrative embodiments of the present invention described in detail herein, Enhanced Variable Rate Codec (EVRC), which is fully familiar to those of ordinary skill in the art, will be assumed to be the coding system being used and, thus, EVRC bitstreams will be presumed. However, it will be obvious to those skilled in the art that the principles of the present invention can be easily extended to other coders as well, including other Code-Excited Linear Prediction (CELP) coders. Specifically, and as is well known to those of ordinary skill in the art, EVRC is a source controlled multi-rate coder, employing 3 different bit rates depending on the characteristics of the frame signal to be encoded. The full rate (8.55 kbit/s) and half rate (4 kbit/s) are used mainly for stationary and transient parts of speech, whereas the eighth rate (0.8 kbit/s) is used for silence and/or background noise. The decoded speech signal of an EVRC bitstream is obtained every 20 msec, and this one frame is further divided into 3 subframes.

FIG. 1 shows a network-based echo suppression system for use in packet-based communications networks in accordance with an illustrative embodiment of the present invention. The illustrative communications environment shown in the figure comprises speaker 11(A) located at one "end" of a communications network, and possible speaker 12(B) located at another "end" of the communications network. In addition, there is the possibility of acoustic echo occurring at the location of possible speaker B. The goal of network-based acoustic echo cancellation (AEC) is to detect, from within the network, when such echo occurs and to suppress it when it does. Note in particular that such echo should be advantageously distinguished from doubletalk, which is the condition when both speakers are simultaneously talking.

In accordance with the illustrative embodiment of the present invention as shown in FIG. 1, packet-based communications network 13 transmits voice packets comprising bitstream, $r_{in}$, which comprises speech data produced by speaker 11(A), through the network to speaker 12(B). In addition, packet-based communications network 13 transmits voice packets comprising bitstream, $s_{in}$, which comprises sound data produced at the location of speaker 12(B), through the network towards speaker 11(A). Note that this sound produced at the location of speaker 12(B) may comprise speech produced by speaker 12(B) himself or herself, it may comprise mere background noise or silence, or it may comprise an echo of the speech produced by speaker 11(A) resulting from, for example, reverberation effects at the location of speaker 12(B). In accordance with the illustrative embodiment of the present invention as shown in the figure and as described herein, packet-based echo suppression system 14 advantageously detects the occurrence of such echo and further advantageously suppresses such detected echo from the bitstream, $s_{in}$, replacing the bitstream with enhanced (i.e., echo-suppressed) bitstream $s_{out}$. Bitstream $r_{in}$ is referred to herein as the "reference" bitstream and bitstream $s_{in}$ is referred to herein as the "target" bitstream. (In particular, packet-based echo suppression system 14 advantageously removes echo from the "target" bitstream by using data provided in the "reference" bitstream.)

Figure 2:
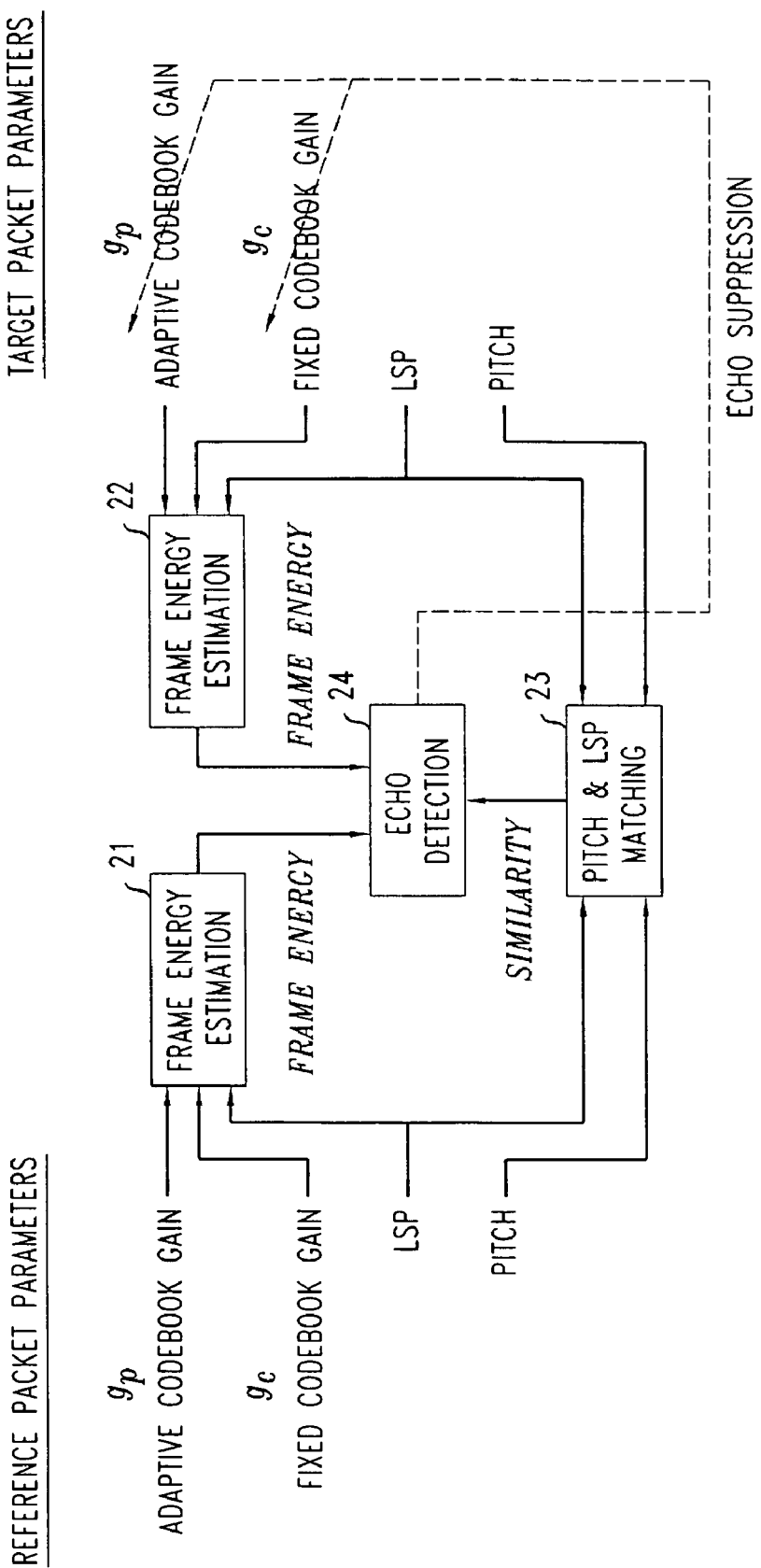
FIG. 2 shows a detailed block diagram of an illustrative network-based echo suppression module, for use in a network-based echo suppression system such as that shown in FIG. 1, in accordance with an illustrative embodiment of the present invention.

FIG. 2 shows a detailed block diagram of an illustrative network-based echo suppression module, for use in a network-based echo suppression system such as that shown in FIG. 1, in accordance with an illustrative embodiment of the present invention. In particular, the illustrative echo suppression system of FIG. 2 is assumed to be operating on an EVRC bitstream. Specifically, the illustrative network-based echo suppression system of FIG. 2 uses a reference packet (e.g., $r_{in}$ as shown in FIG. 1) and a target packet (e.g., $s_{in}$ as shown in FIG. 1), and compares certain characteristics thereof in order to determine whether echo is present, and, in addition, to suppress it if it is.

In operation, frame energy estimation module 21 generates an estimate of the frame energy in a given reference packet frame or subframe, and frame energy estimation module 22 generates an estimate of the frame energy in a given target packet frame or subframe. Each of these frame energy estimation modules advantageously make use of the adaptive codebook gain, the fixed codebook gain and the LSP (line spectral pair parameters, which advantageously may be derived from the LPC, or linear predictive coding, coefficients, and vice versa) from the corresponding packet frame or subframe. In addition, pitch and LSP matching module 23 compares the LSP and pitch parameters from the reference frame or subframe with those of the target frame or subframe and produces a similarity score. (As is well known to those of ordinary skill in the art, adaptive codebook gain, fixed codebook gain, LSP and pitch are all parameters provided by an EVRC codec and are available in an EVRC encoded bitstream.)

Then, echo detection module 24 compares the frame energy estimates produced by frame energy estimation module 21 and frame energy estimation module 22, further taking into account the similarity score produced by pitch and LSP matching module 23, to determine whether echo is likely to be present. In accordance with an illustrative embodiment of the present invention, echo may be detected if the estimated energy of a portion of the target signal is sufficiently lower than the estimated energy of a corresponding portion of the reference signal. For example, the difference between these estimated energy values may be compared to a given threshold to determine if echo is present. In addition, in accordance with an illustrative embodiment of the present invention, this threshold may be advantageously reduced if pitch and LSP matching module 23 produce a sufficiently high similarity score. Finally, if echo detection module 24 detects the presence of echo, it suppresses it by advantageously reducing both the adaptive codebook gain and the fixed codebook gain of the target packet frame or subframe.

Figure 3:
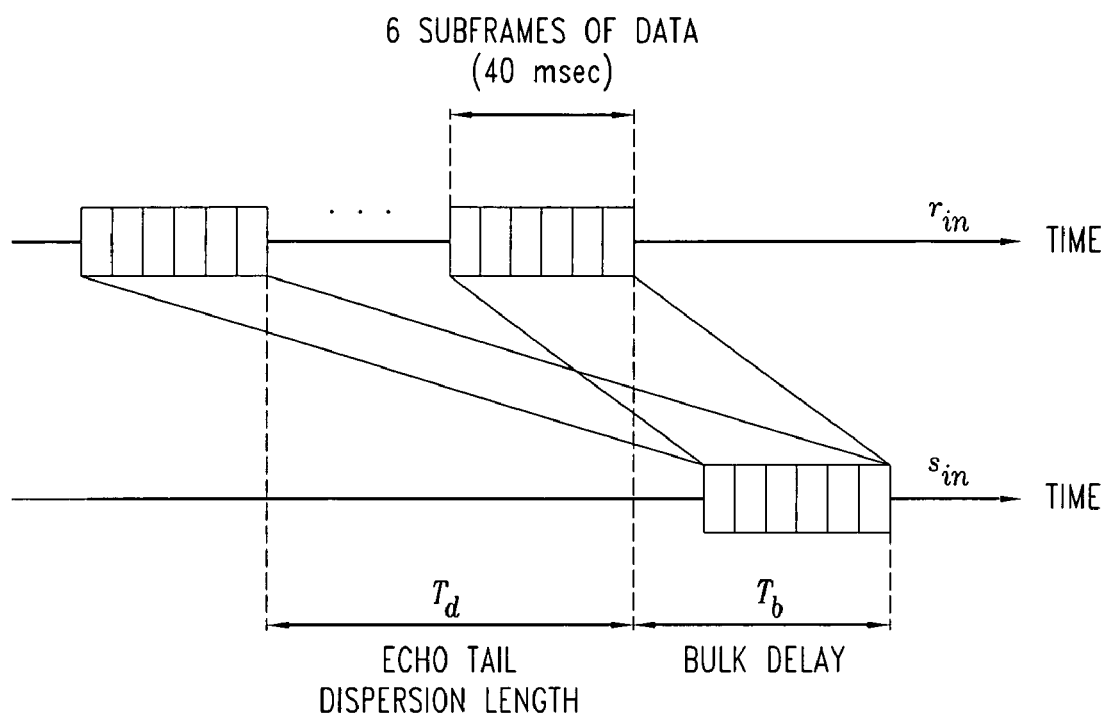
FIG. 3 shows the operation of an echo detection method which may be performed by an illustrative network-based echo detection module, such as that shown in FIG. 2, in accordance with an illustrative embodiment of the present invention.

FIG. 3 shows the operation of an echo detection method which may be performed by an illustrative network-based echo detection module, such as that shown in FIG. 2, in accordance with an illustrative embodiment of the present invention. In particular, the illustrative figure shows a sequence of 6 consecutive subframes of data comprised in the target bitstream, $s_{in}$, which is advantageously compared with one of a number of sequences of 6 consecutive subframes (i.e., 40 msec) of data comprised in the reference bitstream, $r_{in}$. Note that the sequence of subframes in the target data is located later in time than the sequences of subframes in the reference data, since the illustrative echo detection module is searching for a possible echo of reference sound in the target data. More specifically, as can be seen in the figure, sequences of subframes in the reference data which precede the corresponding sequence of subframes in the target data by an amount of time within the range of the bulk delay ($T_b$) through the bulk delay plus the echo tail dispersion length ($T_d$) are advantageously compared with the corresponding sequence of subframes in the target data to detect possible echo. (That is, it is assumed herein that the delay associated with the echo will be between $T_b$ and $T_b+T_d$.)

In accordance with an illustrative embodiment of the present invention, frame energy may be advantageously estimated in accordance with the following mathematical technique. This technique is described in more detail, for example, in U.S. patent application Ser. No. 11/866,448, "Method of Determining an Estimated Frame Energy Of A Communication", filed on Oct. 3, 2007 and assigned to the assignee of the present invention. U.S. patent application Ser. No. 11/866,448 is hereby incorporated by reference as if fully set forth herein. (Other packet-based echo suppression techniques which do not make use of estimated frame energy are described, for example, in U.S. patent application Ser. No. 11/523,051, "Packet Based Echo Cancellation And Suppression", filed on Sep. 19, 2006 and assigned to the assignee of the present invention; and U.S. patent application Ser. No. 11/967,338, "Method And Apparatus For Detecting And Suppressing Echo In Packet Networks", filed on Dec. 31, 2007 and also assigned to the assignee of the present invention. U.S. patent application Ser. No. 11/523,051 and U.S. patent application Ser. No. 11/967,338 are each hereby incorporated by reference as if fully set forth herein.)

The subframe energy of speech at the m-th subframe may be advantageously estimated as the product of two factors:

$$\lambda(m)=\lambda_e(m)\lambda_h(m)$$

where $\lambda_e(m)$ and $\lambda_h(m)$ are the estimated subframe energy of the excitation and the LPC synthesis filter, respectively.

The energy of the LPC synthesis filter may be advantageously approximated as a partial sum of its impulse response as $$\lambda_h(m) = \sum_{n=0}^{K-1} h^2(m;n)$$

where h(m;n) is the impulse response of the LPC synthesis filter and K is illustratively set equal to 6.

The excitation energy may be advantageously approximated as $$\lambda_e(m) = g_p^2(m)\lambda_e(m-1) + C g_c^2(m)$$

for full and half rate frames, and as $$\lambda_e(m) = r_q^2(m)$$

for the eighth rate frames, where $g_p$ is the adaptive codebook gain, $g_c$ is the fixed codebook gain, C is a constant (illustratively set equal to 8), and $r_q(m)$ is the gain at the eighth rate frame. According to the frame erasure handling in EVRC, for example, the estimation of excitation energy of erased frames may be advantageously derived as $$\lambda_e(m) = \begin{cases} (\alpha_f \overline{g_p})^2 \lambda_e(m-1) + 0.01\ \overline{g_c}, & \text{if } \overline{g_p} < 0.4 \\ (\alpha_f \overline{g_p})^2 \lambda_e(m-1), & \text{otherwise} \end{cases}$$

for full and half rate frames, where $\alpha_f$ ($0 \leq \alpha_f \leq 1$) is a fade scaling variable of EVRC whose value may be advantageously adjusted depending on the occurrence of frame error, and where $\overline{g_p}$ and $\overline{g_c}$ are the averages of adaptive and fixed codebook gains of the last valid frame, respectively. And finally, the excitation energy of erased frames for eighth rate is illustratively $$\lambda_e(m) = \overline{r}_q^2$$

where $\overline{r}_q$ is the average gain of the last valid frame.

In accordance with an illustrative embodiment of the present invention, the estimated subframe energy may be advantageously further smoothed by a dual-mode processing in accordance with the following mathematical technique. Let $\Lambda(m) = 10 \log_{10} \lambda(m)$. Then the smoothing may be advantageously performed by $$\overline{\Lambda}(m) = \begin{cases} \alpha_1 \Lambda(m) + (1-\alpha_1)\overline{\Lambda}(m-1) & \text{if } \Lambda(m) > \overline{\Lambda}(m-1) \\ \alpha_2 \Lambda(m) + (1-\alpha_2)\overline{\Lambda}(m-1) & \text{otherwise} \end{cases}$$

with $\alpha_1 > \alpha_2$. The resulting smoothed energy advantageously maintains the abrupt increase of energy in attack parts (onsets) while preventing the energy from tracking abrupt decreases (offsets) in energy over time.

In accordance with an illustrative embodiment of the present invention, echo/doubletalk is advantageously detected based on the above-described (smoothed) energy estimation. In particular, in energy-based echo suppression is to suppress the signal $s_{in}$ (i.e., the return signal in which echo/doubletalk is received) when its energy level is sufficiently lower than that of $r_{in}$ (i.e., the "reference" signal comprising the original speech). If the energy levels of $s_{in}$ and $r_{in}$ are comparable, it may be advantageously assumed that a doubletalk event, rather than an occurrence of (unwanted) echo, is happening. Thus, in accordance with one illustrative embodiment of the present invention, we may advantageously define the echo indicator as $$\zeta(m) = \begin{cases} 1: \text{echo} & \text{if } \overline{\Lambda}_r^*(m) > \overline{\Lambda}_s(m) + TH_{DT} \\ 0: \text{doubletalk} & \text{otherwise} \end{cases}$$

where $$\overline{\Lambda}_r^*(m) = \max_{0 \leq k \leq T_d} \overline{\Lambda}_r(m - T_b - k)$$

is the maximum smoothed frame energy of $r_{in}$, considering $T_b$ and $T_d$, which are the bulk delay and echo tail dispersion length, respectively, $\overline{\Lambda}_s(m)$ is the smoothed frame energy of $s_{in}$, and $TH_{DT}$ is the threshold for doubletalk detection, which may illustratively be set to 20 dB.

In accordance with an illustrative embodiment of the present invention, a perceptual distance between two pitch periods may be advantageously calculated by utilizing the Bark scale, which is a well known perceptual frequency scale in human auditory perception. As is well known to those of ordinary skill in the art, the conversion of frequency, F [kHz], into Bark may be calculated as follows.

$$B = 13 \arctan(0.76F) + 3.5 \arctan(F^2/56.25).$$

The range of pitch period covered in EVRC, for example, is between 20 and 147 samples, which corresponds to frequencies between 54 and 400 Hz, respectively, and in this range the relationship between bark and frequency can be approximated as a linear function with a slope of A=76.6032. As the pitch period is the reciprocal of frequency, the perceptual distance between two pitch periods, $\tau_r$ and $\tau_s$ may be defined as $$d_r(\tau_r, \tau_s) = A \min\left\{\left|\frac{1}{m\tau_r} - \frac{1}{n\tau_s}\right|\right\}, \forall m, n$$

with m=½, 1, 2, and n=½, 1, 2, in order to compensate for possible pitch doubling and halving errors of typical speech coders.

In accordance with an illustrative embodiment of the present invention, cepstral representation may be advantageously used to provide an estimate of the spectral envelope of speech. (Cepstral representations are well known in the art of speech recognition systems).

In particular, the spectral dissimilarity between $r_{in}$ and $s_{in}$ may be advantageously defined as the L2-norm of difference vectors between two cepstral vectors:

$$d_{cep}(c_s, c_r) = \|c_s - c_r\|_2$$

where $c_s$ and $c_r$ are the cepstral vectors of $s_{in}$ and $r_{in}$. Suppose $\alpha_i$'s are the LPC coefficients derived from the LSP coefficients. Then cepstral coefficients may be advantageously obtained by $$c_n = -a_n - \sum_{i=1}^{n-1} \frac{n-i}{n} a_i c_{n-i}, \text{ for } n \leq 1$$

where $\alpha_i = 0$ when i>p, the order of the LPC analysis.

In accordance with an illustrative embodiment of the present invention, echo detection may be advantageously performed based on energy, pitch and LSP. First, note that in defining distortion or similarity between two signals, $s_{in}$ and $r_{in}$, it is preferably to consider a reasonably long time period, as one may otherwise encounter frequent detection errors (i.e., false alarms) due to a possible short-term phonetic content match between two simultaneous talkers if only a very short time period is considered. Thus, a block distance measure is advantageously employed by which the similarity between $s_{in}$ and $r_{in}$ may be illustratively measured for 6 successive subframes (illustratively, 40 msec). The cepstral distance can be defined as $$D_c^*(m) = \min_{0 \le k \le T_d} \sum_{j=0}^{5} d_c(c_s(m-j), c_r(m-j-T_b-k))$$

where $T_b$ and $T_d$ are the bulk delay and echo tail dispersion length, respectively. Similarly, the pitch distance can be defined as $$D_\tau^*(m) = \min_{0 \le k \le T_d} \sum_{j=0}^{5} d_\tau(\tau_s(m-j), \tau_r(m-j-T_b-k)).$$

In accordance with an illustrative embodiment of the present invention, the detection of echo is mainly determined by the frame energy information but is advantageously refined by the help of cepstral and pitch distances. Specifically, when $r_{in}$ and $s_{in}$ have a similarity in terms of the measured cepstral and pitch distances, the threshold for double-talk detection, $TH_{DT}$, may, for example, be advantageously reduced by 6 dB, to increase the probability of suppression in the given time frame. Otherwise, the original value of $TH_{DT}$ is advantageously maintained.

In accordance with certain illustrative embodiments of the present invention, the suppression of echo may be implemented by adjusting the gain terms of the excitation signal. Several such illustrative methods are described below.

For example, as is well known to those of ordinary skill in the art, the total excitation signal of EVRC at the m-th frame is expressed as $$e_T(m;n) = g_p(m)e(m;n) + g_c(m)c(m;n)$$

where $g_p(m)$ is the adaptive codebook gain, $e(m;n)$ is the adaptive codebook contribution, $g_c(m)$ is the fixed codebook gain, and $c(m;n)$ is the fixed codebook contribution. This excitation signal represents glottal signal components of speech and contains major energy information of synthesized speech of EVRC.

Thus, in accordance with one such illustrative embodiment of the present invention, a packet-level acoustic echo suppression system allows for the rate change of EVRC traffic packets, and employs the simplest method which is to replace the full or half-rate packet with the last valid eighth-rate packet, which contains the background noise information. Note that the allowing of rate changes of traffic packets can effect the overall timing, and so may not be acceptable in certain circumstances.

In accordance with another such illustrative embodiment of the present invention, a packet-level acoustic echo suppression system which does not allow for the rate change of EVRC traffic packets operates as follows. Once an echo is detected, the two gain terms, $g_p(m)$ and $g_c(m)$, of $s_{in}$ are modified to suppress the echo such that $$g_p(m) \leftarrow \min\{g_{pcb}\}$$

$$g_c(m) \leftarrow \min\{g_{ccb}\}$$

where $g_{pcb}$ and $g_{ccb}$ are the codewords (values) of the adaptive and fixed codebooks, respectively. Since the minimum value of the adaptive codebook is commonly zero for many coders including EVRC, the resulting excitation may advantageously become $$e_T(m;n) = \min\{g_{ccb}\}c(m;n)$$

Note that this in this method the resulting signal may contain discontinuities of sound in the canceled portion, especially when the background noise level is audible. This is due to the minimum gain setting in the above equation.

In accordance with a third such illustrative embodiment of the present invention, this problem is advantageously mitigated by adjusting the gain term of the excitation such that $$g_p(m) \leftarrow \min\{g_{pcb}\}$$

$$g_c(m) \leftarrow g_{ccb}(IDX^*(mm))$$

Here, $$IDX^*(m) = \arg\min |10 \log_{10}(Cg_{ccb}^2(j)) - b(m)|$$

is advantageously the optimal index of fixed codebook gain, where $g_{ccb}(j)$ is the j-th fixed codebook gain and $b(m)$ is the estimation of the background energy level in decibels:

$$b(m) = \begin{cases} \beta r_q^2(m) + (1-\beta)b(m-1) & \text{if eigth-rate} \\ b(m-1) & \text{otherwise} \end{cases}$$

Addendum to the Detailed Description

It should be noted that all of the preceding discussion merely illustrates the general principles of the invention. It will be appreciated that those skilled in the art will be able to devise various other arrangements, which, although not explicitly described or shown herein, embody the principles of the invention, and are included within its spirit and scope. For example, although the illustrative embodiments described above have been directed to VoIP system environments which use Code-Excited Linear Prediction (CELP) encoding schemes in general and the Enhanced Variable Rate Codec (EVRC) in particular, the principles of the present invention can be applied equally well to other systems which transmit voice over a packet-based communications network.

In addition, all examples and conditional language recited herein are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. It is also intended that such equivalents include both currently known equivalents as well as equivalents developed in the future—i.e., any elements developed that perform the same function, regardless of structure.

What is claimed is:

1. A method for use in suppressing acoustic echo from a reference speech signal in a target speech signal, the target speech signal and the reference speech signal each being transmitted through a packet-based communications network and each having been encoded with a speech coder which generates speech parameters, the target speech signal comprising a sequence of target packets and the reference signal comprising a sequence of reference packets, the method comprising the steps of:

estimating one or more reference speech energy levels in one or more reference packets based on one or more of said speech parameters generated by said encoding of said reference signal;

estimating a target speech energy level in a target packet based on one or more of said speech parameters generated by said encoding of said target signal, the speech parameters comprising one or more linear predictive coding (LPC) coefficient parameters;

comparing the target speech energy level to said one or more reference speech energy levels;

computing a spectral difference between the target packet and one or more of the reference packets based on said LPC coefficient parameters; and detecting an echo in said target speech signal based on said comparison of said target speech energy level to said one or more reference speech energy levels and said spectral difference.

2. The method of claim 1 wherein the speech coder comprises a Code-Excited Linear Prediction (CELP) coder, wherein the speech parameters include one or more excitation gain parameters and one or more linear predictive coding (LPC) coefficient parameters, and wherein the steps of estimating one or more reference speech energy levels and the target speech energy level each comprises estimating both an excitation energy level and a LPC synthesis filter energy level.

3. The method of claim 2 wherein the CELP coder comprises an Enhanced Variable Rate Codec (EVRC).

4. The method of claim 1 wherein the steps of estimating one or more reference speech energy levels and the target speech energy level each comprises smoothing the estimated energy levels over time.

5. The method of claim 1 wherein the speech parameters include one or more pitch parameters, the method further comprising the step of computing a perceptual difference between the pitch parameters of said target packet and the pitch parameters of said one or more of the reference packets, and wherein the step of detecting the echo in said target speech signal is further based on said perceptual difference between said pitch parameters.

6. The method of claim 1 wherein the step of detecting the echo in said target speech signal comprises determining if the target speech energy level is lower than said one or more of said reference speech energy levels by at least a given threshold.

7. The method of claim 6 wherein the given threshold is reduced based on a spectral difference between the target packet and one or more of the reference packets and based on a perceptual difference between pitch parameters of said target packet and of said one or more of the reference packets.

8. The method of claim 1 further comprising the step of suppressing said echo detected in said target speech signal.

9. The method of claim 8 wherein the speech coders comprise multi-rate coders which generate full rate-packets, half-rate packets, and eighth-rate packets, wherein the eight-rate packets represent background noise information, and wherein the step of suppressing said echo detected in said target speech signal comprises replacing one or more full-rate or half-rate target packets with one or more eighth-rate packets.

10. The method of claim 8 wherein the speech coders generate speech parameters which include one or more code book gain parameters, and wherein the step of suppressing said echo detected in said target speech signal comprises replacing one or more codebook gain parameters with replacement codebook gain parameters having smaller values than, the values of the replaced codebook gain parameters.

11. The method of claim 10 wherein one or more of the replacement code book gain parameters comprises a value which is calculated to closely match a background noise energy level.

12. An apparatus for use in suppressing acoustic echo from a reference speech signal in a target speech signal, the target speech signal and the reference speech signal each being transmitted through a packet-based communications network and each having been encoded with a speech coder which generates speech parameters, the target speech signal comprising a sequence of target packets and the reference signal comprising a sequence of reference packets, the apparatus comprising:

an energy estimator which estimates one or more reference speech energy levels in one or more reference packets based on one or more of said speech parameters generated by said encoding of said reference signal, the speech parameters comprising one or more linear predictive coding (LPC) coefficient parameters;

an energy estimator which estimates a target speech energy level in a target packet based on one or more of said speech parameters generated by said encoding of said target signal;

a comparator which compares the target speech energy level to said one or more reference speech energy levels;

a spectral difference calculator which computes a spectral difference between the target packet and one or more of the reference packets based on said LPC coefficient parameters; and an echo detector which detects an echo in said target speech signal based on said comparison of said target speech energy level to said one or more reference speech energy levels and said spectral difference.

13. The apparatus of claim 12 wherein the speech coder comprises a CodeExcited Linear Prediction (CELP) coder, wherein the speech parameters include one or more excitation gain parameters and one or more linear predictive coding (LPC) coefficient parameters, and wherein the energy estimator of the one or more reference speech energy levels and the energy estimator of the target speech energy level each estimate both an excitation energy level and a LPC synthesis filter energy level.

14. The apparatus of claim 13 wherein the CELP coder comprises an Enhanced Variable Rate Codec (EVRC).

15. The apparatus of claim 12 wherein the energy estimator of the one or more reference speech energy levels and the energy estimator of the target speech energy level smooth the estimated energy levels over time.

16. The apparatus of claim 12 wherein the speech parameters include one or more pitch parameters, the apparatus further comprising a pitch difference calculator which computes a perceptual difference between pitch parameters of said target packet and pitch parameters of said one or more of the reference packets, and wherein the echo detector detects the echo in said target speech signal based further on said perceptual difference between said pitch parameters.

17. The apparatus of claim 12 wherein the echo detector detects echo in said target speech signal by determining if the target speech energy level is lower than said one or more of said reference speech energy levels by at least a given threshold.

18. The apparatus of claim 17 wherein the given threshold is reduced based on a spectral difference between the target packet and one or more of the reference packets and based on a perceptual difference between pitch parameters of said target packet and of said one or more of the reference packets.

19. The apparatus of claim 12 further comprising an echo suppressor which suppresses said echo detected in said target speech signal by the echo detector.

20. The apparatus of claim 19 wherein the speech coders comprise multi-rate coders which generate full rate-packets, half-rate packets, and eighth-rate packets, wherein the eight-rate packets represent background noise information, and wherein the echo suppressor suppresses said echo detected in said target speech signal by the echo detector by replacing one or more full-rate or half-rate target packets with one or more eighth-rate packets.

21. The apparatus of claim 19 wherein the speech coders generate speech parameters which include one or more code book gain parameters, and wherein the echo suppressor suppresses the echo detected in said target speech signal by the echo detector by replacing one or more code book gain parameters with replacement codebook gain parameters having smaller values than the values of the replaced code book gain parameters.

22. The apparatus of claim 21 wherein one or more of the replacement code book gain parameters comprises a value which is calculated to closely match a background noise energy level.

* * * * *